United States Patent
Mei et al.

(10) Patent No.: US 7,626,370 B1
(45) Date of Patent: Dec. 1, 2009

(54) APPARATUS AND METHOD FOR HYSTERETIC BOOST DC-DC CONVERTER

(75) Inventors: Tawen Mei, Mountain View, CA (US); Chunping Song, Santa Clara, CA (US)

(73) Assignee: National Semiconductor Corporation, Santa Clara, CA (US)

(*) Notice: Subject to any disclaimer, the term of this patent is extended or adjusted under 35 U.S.C. 154(b) by 272 days.

(21) Appl. No.: 11/859,645

(22) Filed: Sep. 21, 2007

(51) Int. Cl.
G05F 1/40 (2006.01)
G05F 1/10 (2006.01)

(52) U.S. Cl. ..................... 323/282; 323/222
(58) Field of Classification Search ............... 323/222, 323/223, 225, 268, 271, 282, 285, 288, 349–351
See application file for complete search history.

(56) References Cited

U.S. PATENT DOCUMENTS

| | | | |
|---|---|---|---|
| 4,929,882 A | 5/1990 | Szepesi | |
| 5,770,940 A | 6/1998 | Goder | |
| 5,808,455 A * | 9/1998 | Schwartz et al. | 323/271 |
| 6,369,555 B2 | 4/2002 | Rincon-Mora | |
| 6,608,520 B1 * | 8/2003 | Miyazaki | 327/540 |
| 7,193,871 B2 | 3/2007 | Mashiko et al. | |
| 7,457,140 B2 * | 11/2008 | Klein | 363/132 |

OTHER PUBLICATIONS

Keskar, N. et al., Self-stabilizing, integrated, hysteretic boost DC-DC converter, Industrial Electronics Society, 2004, 30th Annual Conference of IEEE, Nov. 2-6, 2004, pp. 586-591, vol. 1.
Nabeshima, T. et al., A Novel Control Method of Boost and Buck-Boost Converters with a Hysteretic PWM Controller, Power Electronics and Applications, 2005 European Conference on Sep. 11-14, 2005, p. 6.

* cited by examiner

*Primary Examiner*—Matthew V Nguyen
(74) *Attorney, Agent, or Firm*—Darby & Darby P.C.; Matthew M. Gaffney

(57) ABSTRACT

A boost hysteretic DC-DC converter is provided. The converter includes a power switch, a hysteretic comparator, an inductor, an output capacitor, and a resistive device. The resistive device is coupled to the bottom of the output capacitor, so that the output voltage is equal to the sum of the capacitor voltage and the voltage across the resistive device. The resistance of the resistance device is sufficiently large that the output voltage ripple is in phase with the inductor current.

20 Claims, 4 Drawing Sheets

APPARATUS AND METHOD FOR HYSTERETIC BOOST DC-DC CONVERTER

FIELD OF THE INVENTION

The invention is related to power converters, and in particular but not exclusively, to a circuit and method for a boost hysteretic DC-DC converter.

BACKGROUND OF THE INVENTION

Three basic switching power supply topologies commonly used are buck converter, boost converter, and buck-boost converter. Of these, the simplest and most common is the buck converter. Various methods have been used to control buck converters in order to maintain an accurate and stable output voltage. Three of the most common methods to control buck converters are hysteretic control, pulse width modulation (PWM), and constant on-time (COT).

For buck converters, single-phase voltage-mode hysteretic control, also called "bang-bang" control or ripple regulator control, typically maintains an output voltage within a hysteresis band centered about an internal reference voltage. If the output voltage reaches or exceeds the reference voltage plus one-half of the hysteresis band, the controller turns OFF the high-side switch, typically a Metal-Oxide Semiconductor Field-Effect Transistor (MOSFET), and turns ON the low-side switch, to block energy from being transferred from an input to an output. This latter condition is a power stage OFF-state, and causes the output voltage to decrease.

When the output voltage is at or below the level of the reference minus one-half of the hysteresis band, the power stage goes into ON-stage, and the controller turns ON the high-side switch, and turns OFF the low-side switch to allow energy transfer from the input to the output, which causes the output voltage to increase. This hysteretic method of control keeps the output voltage within the hysteresis band around the reference voltage.

The two most common control methods for switching boost converters are: 1) fixed-frequency voltage-mode or current-mode; and 2) gated-oscillator. Hysteretic control for boost converters has typically not been possible.

BRIEF DESCRIPTION OF THE DRAWINGS

Non-limiting and non-exhaustive embodiments of the present invention are described with reference to the following drawings, in which.

DETAILED DESCRIPTION

Figure 1:
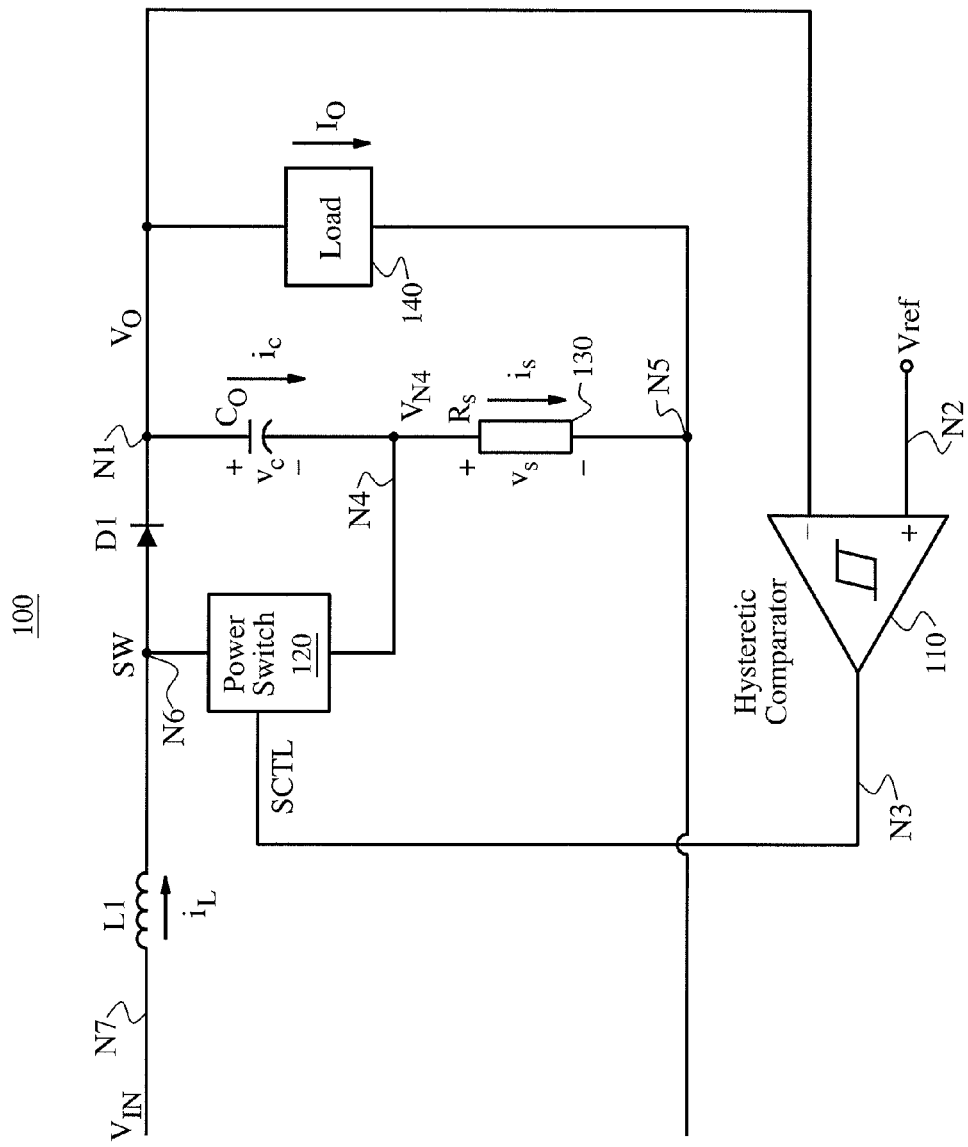
FIG. 1 shows a block diagram of an embodiment of a boost DC-DC converter.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a boost hysteretic DC-DC converter. The converter includes a power switch, a hysteretic comparator, an inductor, an output capacitor, and a resistive device. The resistive device is coupled to the bottom of the output capacitor, so that the output voltage is equal to the sum of the capacitor voltage and the voltage across the resistive device. The resistance of the resistance device is sufficiently large that the output voltage ripple is in phase with the inductor current.

FIG. 1 shows a block diagram of an embodiment of boost hysteretic converter 100 and load 140. Boost DC-DC converter 100 includes resistive device 130, power switch 120, inductor L1, diode D1, capacitor $C_O$, and hysteretic comparator 110.

Hysteretic comparator 110 has a first input that is coupled to output node N1, a second input that is coupled to node N2, and an output that is coupled to node N3. Power switch 120 is coupled between switch node N6 and another node N4, and has a control input that is coupled to node N3. Resistive device 130 is coupled between node N4 and node N5.

Further, hysteretic comparator 110, resistive device 130, and power switch 120 together operate as boost converter circuitry that is arranged to operate in conjunction with external components output capacitor $C_O$ and inductor L1 to convert input voltage Vin at node N7 to output voltage $V_O$ at node N1 (the phrase "boost converter circuitry", as used herein refers to a portion of the boost converter, specifically, a portion of the boost converter that excludes certain external components, such as the inductor, the output capacitor, and the load that the boost converter circuitry is designed to operate in conjunction with). Resistive device 130 has a resistance $R_s$ that is sufficiently large that an output voltage ripple of output voltage $V_O$ at the output node N1 is out of phase with an output capacitor voltage ripple of voltage $v_C$, where $v_C$ is the voltage across output capacitor $C_O$.

Additionally, power switch 120, when turned on by switch control signal SCTL, transfers energy from input voltage Vin to inductor L1. When power switch 120 turns off, this energy is transferred to output capacitor $C_O$ through diode D1.

In one embodiment, hysteretic comparator 120 is arranged to provide switch control signal SCTL based on a comparison of output voltage $V_O$ at node N1 with reference voltage $V_{ref}$ at node N2. In one embodiment, when the output voltage is at or below the level of the reference minus a hysteresis value (e.g. one-half of the hysteresis band in one embodiment), signal SCTL is asserted, which turns off power switch 120 to allow energy transfer from the input to the output, which causes output voltage $V_O$ to increase. In one embodiment, this hysteretic method of control keeps output voltage $V_O$ within the hysteresis band around reference voltage $V_{ref}$. Load 140 is driven by output voltage $V_O$.

In one embodiment, hysteretic comparator 110, resistive device 130, and power switch 120 are on-chip, and the other circuit elements illustrated in FIG. 1 are off-chip. In other embodiments, power switch 120 and/or resistive device 130 may be off-chip. In some embodiments, some of the other components may be on-chip. In some embodiments, diode D1 may be replaced with a synchronous switch, which may be off-chip or on-chip in various embodiments. Also, although not shown in FIG. 1, boost hysteretic converter 100 may have more features than shown, which may be on-chip, such as current limiting, de-glitching, and/or the like. For example, in one embodiment, a de-glitcher (not shown) is coupled between the output of the hysteretic comparator at node N3 and the control input of power switch 120. Further, boost hysteretic converter 100 may also include still other circuitry not shown, such as a reference voltage circuit that provides voltage $V_{ref}$; the voltage reference circuit may be on-chip or off-chip. Some embodiments include a voltage divider that provides a feedback voltage from the output voltage, and provides the feedback voltage to the hysteretic comparator rather than providing the output voltage directly, so that the output voltage is coupled to the first input of the hysteretic comparator via the voltage divider, rather than being connected directly. These variations and others are within the scope and spirit of the invention.

Figure 2:
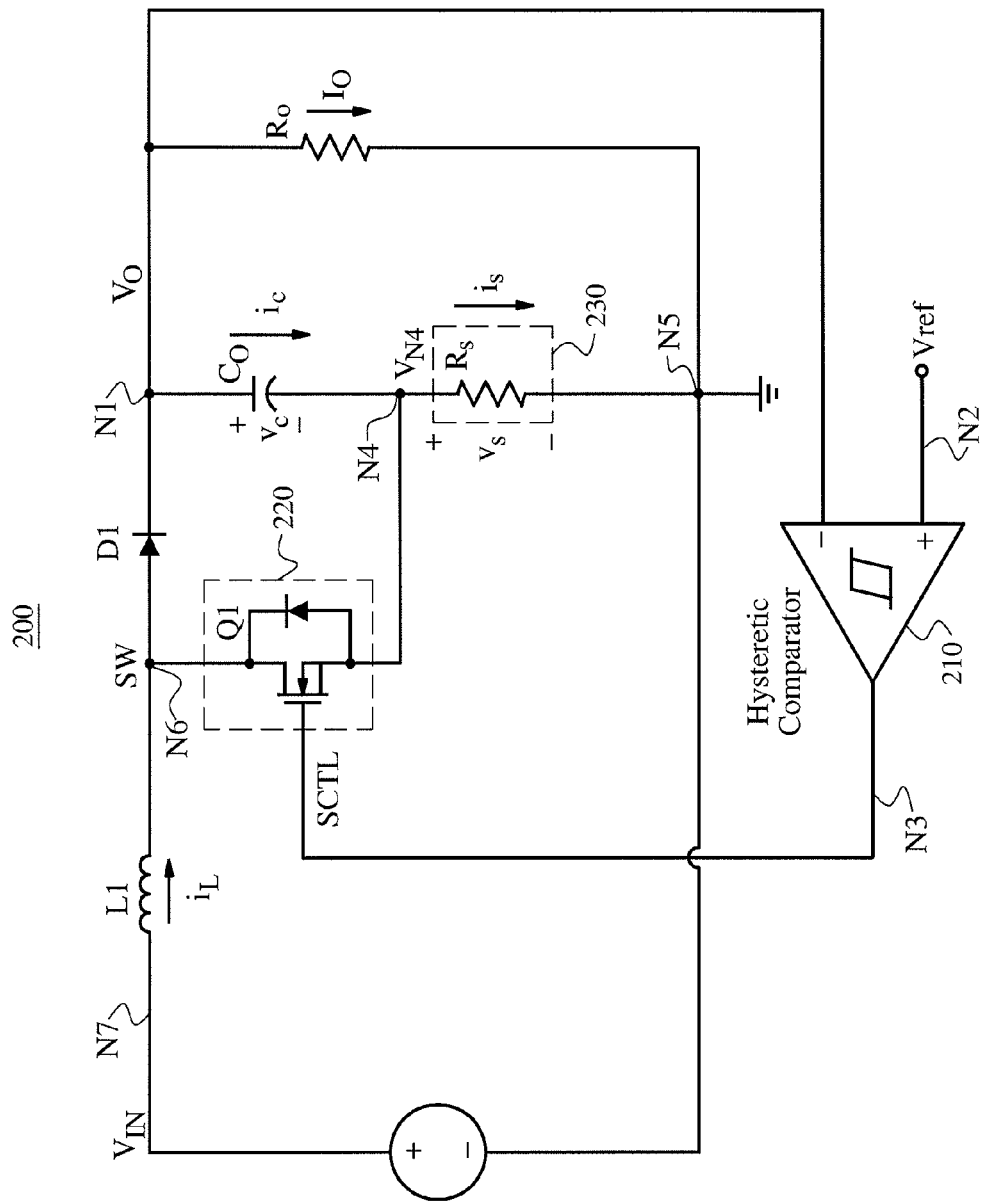
FIG. 2 illustrates a block diagram of an embodiment of the circuit of FIG. 1.
Figures 3A, 3B, 3C, 3D, 3E, 3F:
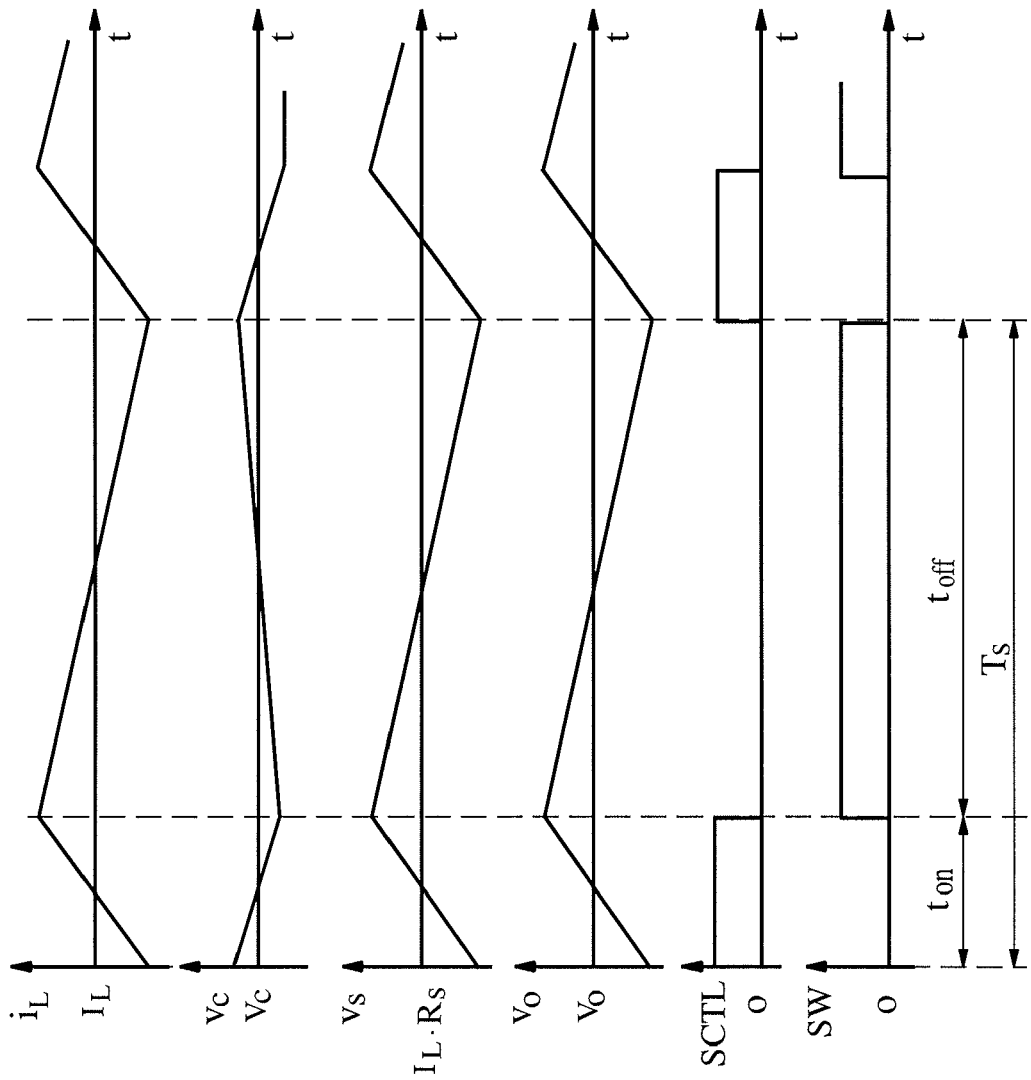
FIGS. 3A-3F show timing diagrams of waveforms of embodiments of signals for an embodiment of the circuit of FIG. 2.

FIG. 2 illustrates a block diagram of an embodiment of boost hysteretic converter 200, which may be employed as an embodiment of boost hysteretic converter 100 of FIG. 1. Power switch 220 includes power transistor Q1. Resistive device 230 may include resistor $R_s$. The load (e.g. load 140 of FIG. 1) is represented by resistor $R_O$.

In a conventional hysteretic converter, the voltage across the output capacitor is the output voltage. However, in boost hysteretic converter 200, the output voltage $V_O$ is given by $v_C + v_S$, where $v_C$ is the voltage across output capacitor $C_O$, and $v_S$ is the voltage across resistor $R_s$. The ripple of capacitor voltage $v_C$ is out of phase with inductor current $i_L$. That is, the ripple of capacitor voltage $v_C$ decreases when inductor current $i_L$ increases, and the ripple of capacitor voltage $v_C$ increases when inductor current $i_L$ decreases. However, resistor $R_s$ is sufficiently large that the ripple of output voltage $V_O$ is in phase with inductor current $i_L$. That is, the ripple of output voltage $V_O$ rises when inductor current $i_L$ rises, and the ripple of output voltage $V_O$ falls when inductor current $i_L$ falls.

When signal SCTL is asserted, power switch Q1 turns on and the inductor current $i_L$ flows through $R_s$. At the same time, the capacitor current $i_C$ also flows through $R_s$. The total current flowing through $R_s$ during ON time is $$i_s = i_L + i_C \quad (1)$$

And $i_C$ during ON time is $$i_C = -I_o \quad (2)$$

Substituting (2) into (1) to obtain $i_s$, the current flowing through the sense resistor $R_s$ during ON time:

$$i_s = i_L - I_o \quad (3)$$

Next, when signal SCTL is de-asserted, Q1 turns off, and substantially no current flows through transistor Q1. At this time, only the capacitor current $i_C$ flows through the $R_s$. Accordingly, the current flowing through the sense resistor $R_s$ during OFF time is $$i_s = i_C \quad (4)$$

And $i_C$ during OFF time is $$i_C = i_L - I_o \quad (5)$$

Substituting (5) into (4) to obtain $i_S$, the current flowing through $R_s$ during OFF time:

$$i_s = i_L - I_o \quad (6)$$

Accordingly, $i_s = i_L - I_o$ regardless of whether switch Q1 is on or off, so that the current flowing through sense resistor $R_s$ is always equal to the inductor current $i_L$ minus the output current $I_o$. The output voltage, $V_O$, is the sum of two voltages: the output capacitor voltage and the voltage across the sense resistor, or $v_C$ and $v_S$ respectively. The ripple voltage across the capacitor is out of phase with the inductor current ripple $i_L$, but the ripple voltage across the sense resistor $R_s$ is in phase with the inductor current because $v_s = i_s \cdot R_s$. To ensure the total ripple voltage is in phase with the inductor current, a minimum resistor value $R_s$ is employed. Accordingly, the voltage ripple of the output capacitor is:

$$\frac{I_O}{C} \cdot DF \cdot \Delta T = \frac{V_O}{R_O \cdot C} \cdot DF \cdot \Delta T, \quad (7)$$

where $I_o$ is the output current, $V_O$ is the output voltage, $R_o$ is the equivalent output load resistance, C is the capacitance of output capacitor $C_O$, DF is the duty factor, and where $\Delta T$ is the period of switching frequency. To ensure the total ripple voltage is in phase with the inductor current, this ripple voltage must be no greater than that of the sense resistor, which is:

$$Rs \cdot \frac{VIN}{L} \cdot DF \cdot \Delta T. \quad (8)$$

where L is the inductance of inductor L1. Applying the aforementioned inequality, $$C > \frac{V_o}{V_{in}} \cdot \frac{1}{R_o} \cdot \frac{L}{R_s} \quad (9)$$

Expressed in terms of $R_s$, $$R_s > \frac{V_o}{V_{in}} \cdot \frac{C}{R_o} \cdot L \quad (10)$$

When this inequality is obeyed, the overall output voltage ripple is in phase with the inductor current ripple. By doing so, power switch Q1 in a boost converter can be controlled by a simple hysteretic comparator like that of a buck hysteretic converter. The output voltage and its ripple can be sensed and controlled by a fixed reference voltage and the hysteresis of the comparator.

Although resistor $R_s$ is shown as a resistor in FIG. 2, virtually any resistive device may be used for resistive $R_s$, such as a transistor biased as a resistive device, a printed circuit board trace, or the like, as long as $R_s$ is sufficiently large that inequality (10) above is met.

The circuit of FIG. 2 provides a boost hysteretic converter that is relatively simply, stable, easy to integrate, and easy to use. In low power and portable applications (such as cells phones, Personal Desktop Assistants (PDAs), and digital cameras), an integrated boost DC-DC converter offers advantages in terms of cost, size, and design complexity. For example, a boost DC-DC converter may be needed to convert a single-cell or dual-cell battery voltage into a 3.3V or 5V voltage in such applications. Gated-oscillator boost converters typically have very high output ripple voltage, poor transient performance, and restricted range of operating points. PWM-control boost converters have better performance than gated-oscillator boost converters, but the dependence of frequency compensation on external components limits the applications of integrated PWM-Control boost converters to only very narrow cases. Frequency compensation adds cost while limiting the range of off-chip components such as the inductor and output capacitor, and does not allow users to optimize the performance because the frequency compensation is fixed inside the chip, which limits the inductor and output capacitor selection. When left off-chip, the frequency compensation components often take up more printed circuit board area than the boost converter chip itself, and tends to be difficult to design. In contrast, the circuit of FIG. 2 allows an integrated boost DC-DC converter that does not need frequency compensation and that can keep the converter stable over wide L-C component values.

FIGS. 3A-3F show timing diagrams of waveforms of embodiments of signals $i_L$, $v_C$, $i_L*R_s$, $V_O$, SCTL, and SW, respectively, for an embodiment of the circuit 200 of FIG. 2.

Figure 4:
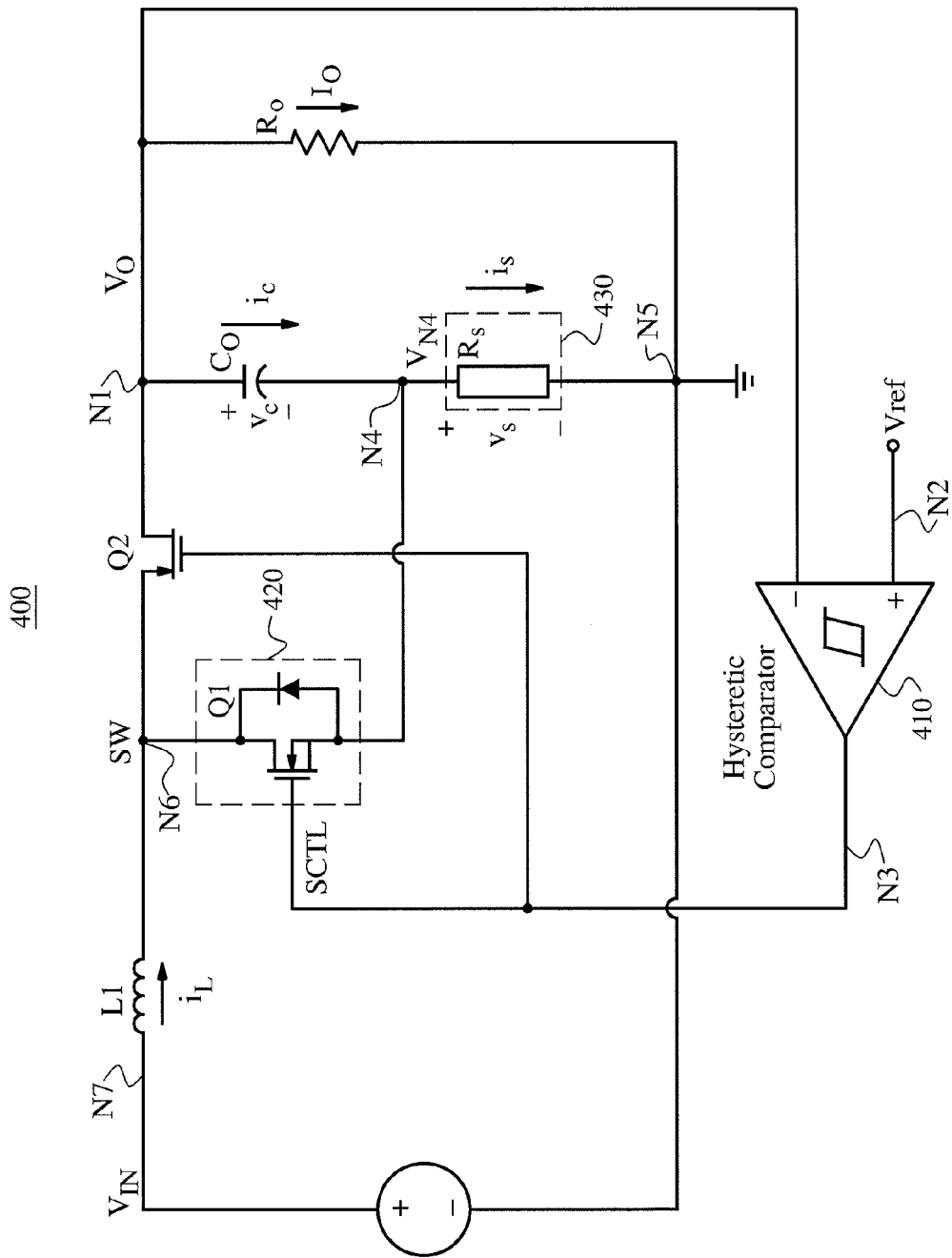
FIG. 4 illustrates a block diagram of an embodiment of the circuit of FIG. 2, arranged in accordance with aspects of the present invention.

FIG. 4 illustrates a block diagram of an embodiment of boost hysteric converter 400, which may be employed as an embodiment of circuit of FIG. 2. In circuit 400, diode D1 is replaced with synchronous switch transistor Q2, which is controlled based, at least in part, on signal SCTL.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for regulation, comprising:
   boost converter circuitry, including:
   a hysteretic comparator having at least a first input, a second input, and an output, wherein the first input of the hysteretic comparator is coupled to an output node;
   a power switch that is coupled between a switch node and another node; and
   a resistive device that is coupled to said another node, wherein the boost converter circuitry is arranged to operate with an output capacitor coupled between the output node and said another node, the resistive device is arranged to provide a portion of an output voltage at the output node, and wherein the resistive device has a resistance that is sufficiently large that an output voltage ripple of the output voltage is out of phase with an output capacitor voltage ripple of a voltage across the output capacitor.

2. The circuit of claim 1, wherein the power switch is arranged to selectively couple the switch node to said another node based, at least in part, on whether the hysteretic comparator is tripped.

3. The circuit of claim 1, wherein the power switch is a power transistor having at least a gate that is coupled to the output of the hysteretic comparator, a drain that is coupled to the switch node, and a source that is coupled to said another node.

4. The circuit of claim 1, wherein the resistive device is arranged such that the output voltage is substantially equal to a sum of a voltage across the output capacitor and a voltage across the resistive device.

5. The circuit of claim 1, wherein the boost converter circuitry is arranged to operate in conjunction with an inductor that is coupled between an input node and the switch node, the boost converter circuitry is arranged to drive a load, and
wherein the resistive device is arranged such that a current through the resistive device is substantially equal to an inductor current of the inductor minus an load current of the load, regardless of whether the power switch is open or closed.

6. The circuit of claim 1, wherein the resistor is coupled between said another node and yet another node, and
wherein the boost converter circuitry is arranged to drive a load that is coupled between the output node and said yet another node.

7. The circuit of claim 1, wherein the boost converter circuitry is arranged to convert an input voltage at an input node into the output voltage, and
wherein the resistance of the resistive device is sufficiently large to meet the following inequality:

$$R_s > \frac{V_o}{V_{in}} \cdot \frac{C}{R_o} \cdot L,$$

where $R_s$ represents the total equivalent resistance of the resistive device, $V_O$ represents the output voltage, $V_{in}$ represents the input voltage, C represents the capacitance of an output capacitor, and where L represents the inductance of an inductor that is coupled between the input node and the switch node.

8. A circuit for regulation, comprising:
a boost converter, including:
   a hysteretic comparator having at least a first input that is coupled to a first node, a second input that is coupled to a second node, and an output that is coupled to a third node;
   a capacitor that is coupled between the first node and the fourth node;
   a resistive device that is coupled between the fourth node and a fifth node, such that a voltage drop because between the first node and the fifth node includes a sum of a voltage across the capacitor and a voltage across the resistive device; and
   a power transistor having at least a gate that is coupled to the third node, a source that is coupled to the fourth node, and a drain that is coupled to a sixth node.

9. The circuit of claim 8, wherein
the resistive device has a resistance that is sufficiently large that an output voltage ripple of an output voltage at the first node is out of phase with an output capacitor voltage ripple of the voltage across the capacitor, and such that the output voltage ripple is in phase with an inductor current.

10. The circuit of claim 8, wherein
the boost converter further includes a device that is coupled between the sixth node and the first node,
wherein the device is at least one of a diode or a synchronous switch.

11. The circuit of claim 8, further comprising:
a reference voltage circuit having at least an output that is coupled to the second node.

12. The circuit of claim 8, wherein
the fifth node is ground.

13. The circuit of claim 8, further comprising:
a load that is coupled between the first node and the fifth node.

14. The circuit of claim 8, further comprising
a voltage divider that is coupled between the output voltage and first input of the hysteretic comparator, such that the first input of the hysteretic comparator is coupled to the output voltage via the voltage divider, wherein the boost converter further includes a de-glitcher that is coupled between the third node and the gate of the power transistor, so that the gate of the power transistor is coupled to the third node via the de-glitcher.

15. The circuit of claim 8, wherein
the boost converter further includes an inductor that is coupled between a seventh node and the sixth node.

16. The circuit of claim 15, wherein
a resistance of the resistive device is sufficiently large to meet the following inequality:

$$R_s > \frac{V_o}{V_{in}} \cdot \frac{C}{R_o} \cdot L,$$

where $R_s$ represents the total equivalent resistance of the resistive device, $V_O$ represents the output voltage, $V_{in}$ represents a voltage at the seventh node, C represents the capacitance of the capacitor, and where L represents the inductance of the inductor.

17. A method for regulation, comprising:
converting an input voltage at an input node into an output voltage at an output node that is greater than the input voltage, including:
  comparing the output voltage with a reference voltage, such that the comparison includes hysteresis;
  employing a result of the comparison to selectively transfer energy from an inductor that is coupled to the input node to an output capacitor that is coupled to the output node; and
  adding a ramp to the output voltage such that the output voltage ripple is out of phase with an output capacitor ripple of a voltage across the output capacitor, and such that an output ripple of the output voltage is substantially proportional to an inductor current that is associated with the inductor.

18. The method of claim 17, wherein
comparing the output voltage with the reference voltage includes:
  providing a feedback voltage from the output voltage;
  asserting a comparison output signal if the feedback voltage is less than a reference voltage minus half of a hysteretic band of the comparison, wherein the comparison output signal indicates the result of the comparison; and
  de-asserting the comparison output signal if the feedback voltage is greater than the reference voltage plus half of the hysteretic band of the comparison.

19. The method of claim 17, wherein
selectively transferring energy from the inductor to the output capacitor includes selecting coupling a switch node to another node based on the result of the comparison.

20. The method of claim 19, wherein
adding the ramp to the output voltage includes employing a resistor that is coupled between said another node and yet another node,
wherein the output capacitor is coupled between said another node and the output node, and
wherein the inductor is coupled between the input node and the switch node.

* * * * *

UNITED STATES PATENT AND TRADEMARK OFFICE
CERTIFICATE OF CORRECTION

PATENT NO. : 7,626,370 B1
APPLICATION NO. : 11/859645
DATED : December 1, 2009
INVENTOR(S) : Tawen Mei et al.

Page 1 of 1

It is certified that error appears in the above-identified patent and that said Letters Patent is hereby corrected as shown below:

In column 2, line 55, delete "Vin" and insert -- $V_{in}$ --, therefor.

In column 2, line 67, delete "Vin" and insert -- $V_{in}$ --, therefor.

In column 4, line 46, delete " $Rs \cdot \frac{VIN}{L} \cdot DF \cdot \Delta T$ . " and insert -- $Rs \cdot \frac{V_{in}}{L} \cdot DF \cdot \Delta T$ . --, therefor.

In column 7, line 21, in claim 14, after "comprising" insert -- : --.

Signed and Sealed this

Thirtieth Day of March, 2010

David J. Kappos
*Director of the United States Patent and Trademark Office*